UNITED STATES PATENT OFFICE.

ISAAC BROWN, OF PHILADELPHIA, PENNSYLVANIA.

IMPROVEMENT IN MEDICAL COMPOUNDS FOR THE CURE OF CHILLS AND FEVER.

Specification forming part of Letters Patent No. 121,989, dated December 19, 1871.

*To all whom it may concern:*

Be it known that I, ISAAC BROWN, of the city and county of Philadelphia, and State of Pennsylvania, have invented a certain new and Improved Compound for the Cure of Chills and Fever, which I denominate "Brown's Vegetable Ague Cure," of which the following is a description:

The ingredients composing the compound, and the proportional parts thereof to make one gallon of the mixture, are as follows: One pound of black haw's root bark; one pound of dogwood root bark; two ounces of blood root; one ounce of hoarhound; one ounce of boneset; two pounds of white sugar; one pint of alcohol. The above ingredients are put in two gallons of water and boiled down to one gallon, when it is bottled and ready for use.

Chills and fever arise from the negative state of the system—that is, the capillaries upon the surface are closed, and the natural currents are all inward. This state is first produced by a morbid liver and closing up of the biliary ducts so that the effete matter naturally generated in the system cannot escape, and the purulent matter that has thus collected internally is brought in contact with the natural electric fluids (or heat) of the system, and greater internal heat, of course, is the result, which continuously increases until the chill is driven off and the heat preponderates, which we call the fever. The cure, therefore, consists in a remedy that will act upon the nerves and blood by opening the pores of the skin to let off this morbid matter by gentle warmth of the surface, and to keep open these capillaries until the system is entirely cleansed. The former two ingredients are calculated to act directly upon the liver, spleen, stomach, &c., in opening the natural ducts and channels; and the blood root, hoarhound, and boneset are phlogistic as well as slightly nauseating in their combined therapeutic properties, and are calculated to open and keep open the capillaries to the surface of the body, whereby the disease is thrown off and finally cured.

I do not confine the use of my compound to the cure of chills and fever, simply, but propose to use it in the treatment of other fevers and disorders of a similar nature.

All the foregoing remedies are harmless of themselves, and act together harmoniously to enrich the blood, strengthen the nervous force, on which the blood is somewhat dependent, and, together with the sugar, (added not only as a preservative but being almost pure carbon,) is calculated, when taken as a medicine, to give power to and strengthen the system.

Having described my invention, I claim—

The compound herein described, of, or of about, the proportions stated, and used as a cure for the disorders stated.

In testimony whereof I have hereunto signed my name.

ISAAC BROWN.

Witnesses:
SAML. P. JONES, Jr.,
SAML. P. JONES. (98)